United States Patent
Lin et al.

(10) Patent No.: US 8,606,429 B2
(45) Date of Patent: Dec. 10, 2013

(54) SYSTEM AND METHOD FOR CONTROLLING AN ELECTRONIC DEVICE FAN

(75) Inventors: Meng-Hsien Lin, Taipei Hsien (TW); Yao-Ting Chang, Tu-Cheng (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 211 days.

(21) Appl. No.: 12/979,348

(22) Filed: Dec. 28, 2010

(65) Prior Publication Data

US 2012/0035769 A1  Feb. 9, 2012

(30) Foreign Application Priority Data

Aug. 6, 2010 (TW) .............................. 99126200 A

(51) Int. Cl.
| | |
|---|---|
| G05D 13/00 | (2006.01) |
| G05D 23/00 | (2006.01) |
| G01R 25/00 | (2006.01) |
| G01R 29/02 | (2006.01) |
| G06F 15/00 | (2006.01) |
| G01K 11/00 | (2006.01) |
| G01P 3/00 | (2006.01) |
| H02P 5/00 | (2006.01) |
| H02P 7/00 | (2006.01) |
| H02P 6/06 | (2006.01) |
| G05B 11/28 | (2006.01) |

(52) U.S. Cl.
USPC ............. 700/304; 700/300; 702/79; 702/96; 702/99; 702/130; 702/145; 318/268; 318/400.03; 318/400.12; 318/599; 318/811

(58) Field of Classification Search
USPC ........ 700/275, 299, 300, 304; 702/57, 79, 99, 702/130, 132, 136, 96, 142, 145; 318/255, 318/268, 400.3, 400.37, 599, 400.01, 318/400.09, 400.12, 432, 727, 767, 807, 318/810, 811; 388/800, 803, 804, 809, 811, 388/816, 819, 828, 831
See application file for complete search history.

(56) References Cited

U.S. PATENT DOCUMENTS

| | | | | |
|---|---|---|---|---|
| 7,012,390 | B1 * | 3/2006 | Able et al. | 318/268 |
| 7,047,756 | B2 * | 5/2006 | Getz et al. | 62/259.2 |
| 7,069,172 | B2 * | 6/2006 | Bekker et al. | 702/145 |
| 7,076,159 | B2 * | 7/2006 | Bekker | 388/800 |
| 7,092,623 | B2 * | 8/2006 | Bekker | 318/400.37 |
| 7,098,617 | B1 * | 8/2006 | Oljaca et al. | 318/268 |
| 7,190,142 | B2 * | 3/2007 | Ha | 318/599 |
| 7,275,380 | B2 * | 10/2007 | Durant et al. | 62/178 |
| 7,305,316 | B2 * | 12/2007 | Frankel et al. | 702/99 |
| 7,375,486 | B2 * | 5/2008 | Ku et al. | 318/599 |
| 7,479,753 | B1 * | 1/2009 | Mimberg | 318/599 |
| 7,495,407 | B2 * | 2/2009 | Huang et al. | 318/599 |
| 8,140,196 | B2 * | 3/2012 | Rozzi et al. | 700/300 |
| 2005/0047922 | A1 * | 3/2005 | Brown | 417/22 |
| 2007/0098374 | A1 * | 5/2007 | Fujiwara | 388/811 |
| 2007/0184775 | A1 * | 8/2007 | Perkins et al. | 454/273 |
| 2010/0289438 | A1 * | 11/2010 | Fan Chiang et al. | 318/400.3 |
| 2012/0017856 | A1 * | 1/2012 | Nicgorski | 123/41.11 |

* cited by examiner

Primary Examiner — Crystal J Barnes-Bullock
(74) Attorney, Agent, or Firm — Altis Law Group, Inc.

(57) ABSTRACT

An electronic device and a method for controlling fan speed of the electronic device include setting a speed range corresponding to a variety of pulse-width modulation (PWM) duty cycles of the fan, and setting a speed variation value of the fan. The method further includes reading the PWM duty cycle and detecting an actual speed of the fan, and adjusting the PWM duty cycle in the PWM duty cycle instruction according to the speed variation value.

17 Claims, 4 Drawing Sheets

SYSTEM AND METHOD FOR CONTROLLING AN ELECTRONIC DEVICE FAN

BACKGROUND

1. Technical Field

Embodiments of the present disclosure relate to device control, and in particular, to a system and method for controlling speed of an electronic device fan.

2. Description of Related Art

In order to conserve electricity energy and reduce noise of a cooling system in an electronic device, a fan of the electronic device be required to maintain a low speed when the electronic device is in a low temperature environment. However, it is difficult to control the low speed of the fan. For example, if the electronic device in the low temperature environment requires that the speed of the fan is a preset value, such as 850 revolutions per minute (RPM), an actual speed of the fan may be lower than the preset value. Therefore, performance of the cooling system is insufficient.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word "module," as used herein, refers to logic embodied in hardware or firmware, or to a collection of software instructions, written in a programming language, for example, Java, C, or Assembly. One or more software instructions in the modules may be embedded in firmware, such as an EPROM. It will be appreciated that modules may comprised connected logic units, such as gates and flip-flops, and may comprise programmable units, such as programmable gate arrays or processors. The modules described herein may be implemented as either software and/or hardware modules and may be stored in any type of computer-readable medium or other computer storage system.

Figure 1:
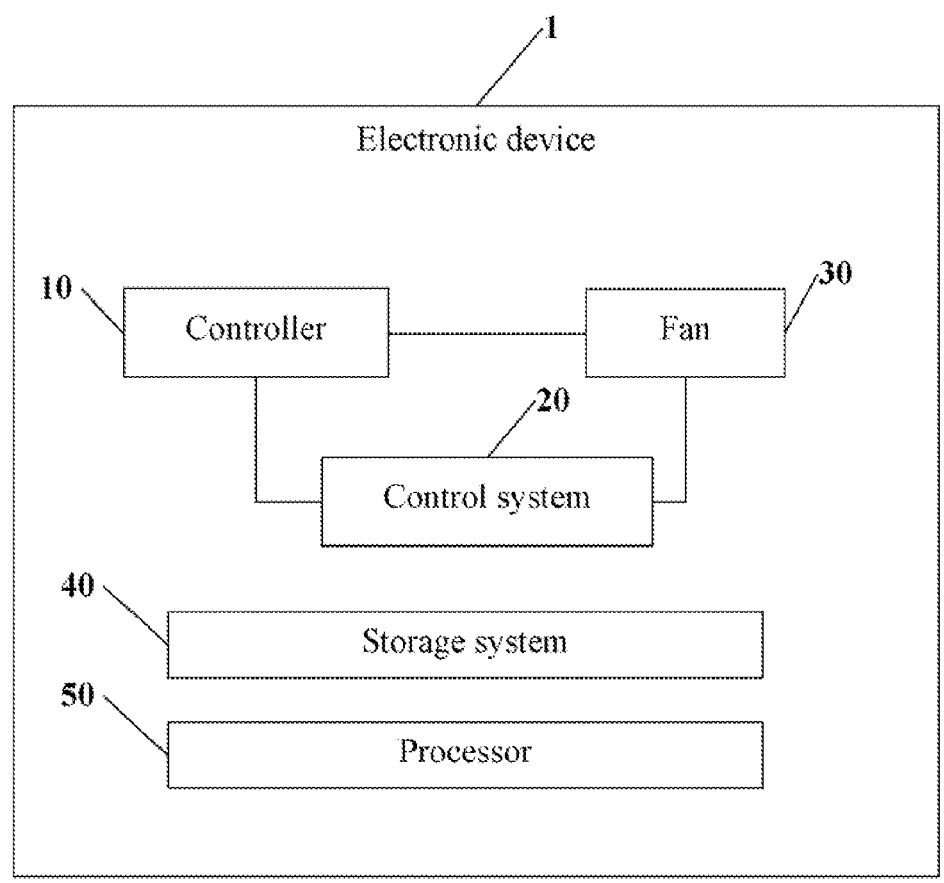
FIG. 1 is a schematic diagram of one embodiment of an electronic device including a control system.

FIG. 1 is a schematic diagram of one embodiment of an electronic device 1 including a control system 20. The electronic device 1 can be a desktop computer, a notebook computer, or a server. The electronic device 1 includes a controller 10 connected to and controlling a fan 30. The controlling system 20 may ensure and control a speed of the fan 30 to be in a corresponding range of predetermined speed of the fan 30. The fan 30 may be used to cool components of the electronic device 1, such as a central processing unit (CPU), for example. The controller 10 can be a basic input/output system (BIOS), or a basic management controller (BMC). The fan 30 and the components of the electronic device 1 may be coupled to a motherboard of the electronic device 1, in one example.

In some embodiments, the controller 10 sends a pulse-width modulation (PWM) duty cycle instruction to control the speed of the fan 30. If the PWM duty cycle instruction is "PWM duty cycle=20%", the controller 10 sets the speed of the fan 30 to have a 20% duty cycle.

The electronic device 1 further includes a storage system 40, and at least one processor 50. The storage system 40 can be a memory of the electronic device 1, or an external storage card, such as a smart media (SM) card, or a secure digital (SD) card. The at least one processor 50 executes one or more computerized codes of the electronic device 1 and other applications, to provide the functions of the electronic device 1.

Figure 2:
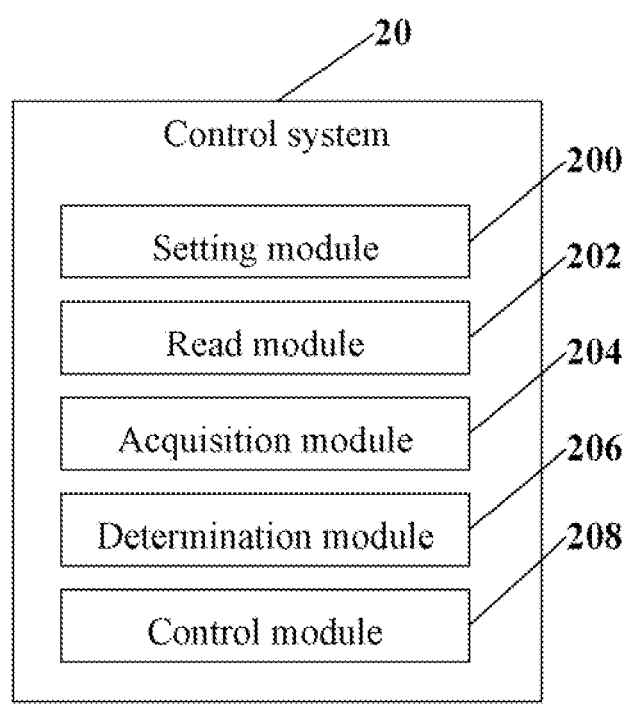
FIG. 2 is a block diagram of one embodiment of the control system of FIG. 1.

FIG. 2 is a block diagram of one embodiment of the control system 20 of FIG. 1. In some embodiments, the control system 20 includes a setting module 200, a read module 202, an acquisition module 204, a determination module 206, and a control module 208. The modules 200, 202, 204, 206, and 208 comprise computerized code in the form of one or more programs that are stored in the storage system 40. The computerized code includes instructions that are executed by the at least one processor 50 to provide functions for modules 200, 202, 204, 206, and 208. Details of these operations follow.

Figure 3:
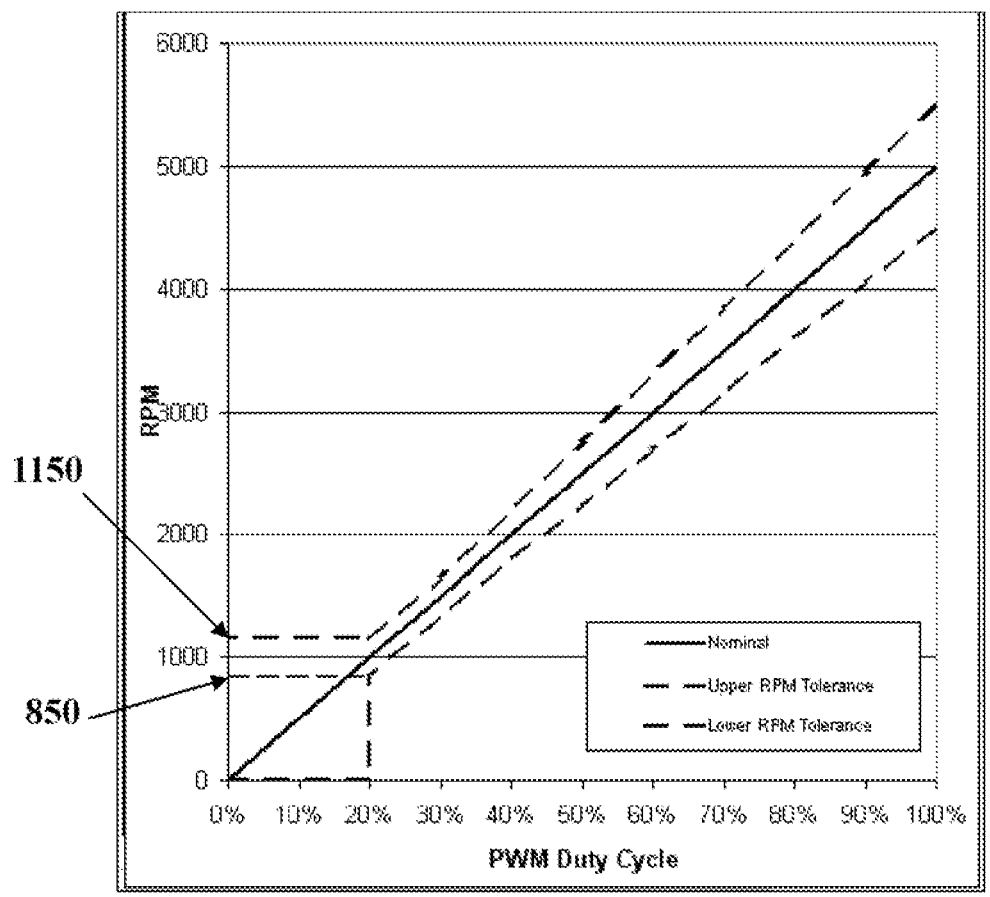
FIG. 3 is a schematic diagram of one embodiment of RPM ranges corresponding to PWM duty cycles.

The setting module 200 sets a revolutions per minute (RPM) range corresponding to each of a plurality of PWM duty cycles of the fan 30, and sets a speed variation value of the fan 30. FIG. 3 is a schematic diagram of one embodiment of the plurality of PWM duty cycles corresponding to different RPM ranges. For example, the setting module 200 sets a range of [850 RPM, 1150 RPM] corresponding to a PWM duty cycle of 20%. The speed variation value can be 2%, for example.

The read module 202 reads the PWM duty cycle of the fan 30 by reading the PWM duty cycle instruction sent to the fan 30 from the controller 10.

The acquisition module 204 acquires an actual speed of the fan 30. In some embodiments, the controller 10 can detect the actual speed of the fan 30. The acquisition module 204 acquires the actual speed from the controller 10. The actual speed of the fan 30 is measured in RPM.

The determination module 202 determines whether the actual speed of the fan 30 is within a corresponding RPM range. In some embodiments, the determination module 202 determines whether the actual speed is lower than or equal to the maximum speed of the corresponding RPM range, and larger than or equal to the minimum speed of the corresponding RPM range. For example, the RPM range of [850 RPM, 1150 RPM] corresponds to the PWM duty cycle of 20%. If the read module 202 reads the PWM duty cycle of 20%, and the acquisition module 204 acquires the actual speed of 900 RPM, the determination module 202 determines that the actual speed is within the RPM range of [850 RPM, 1150 RPM]. If the actual speed is equal to the 850 RPM or 1150 RPM, the determination module 204 also determines that the actual speed of the fan 30 is within the corresponding RPM range.

If the actual speed of the fan 30 is within the corresponding RPM range, the control module 208 maintains the PWM duty cycle in the PWM duty cycle instruction.

If the actual speed of the fan 30 is not within the corresponding RPM range, the determination module 206 further determines whether the actual speed of the fan 30 exceeds a maximum speed of the corresponding RPM range.

If the actual speed of the fan 30 exceeds a maximum speed of the corresponding RPM range, the control module 208 further reduces the PWM duty cycle in the PWM duty cycle instruction according to the speed variation value. If the actual speed of the fan 30 is lower than a minimum speed of the corresponding RPM range, the control module 208 further increases the PWM duty cycle according to the speed variation value.

Figure 4:
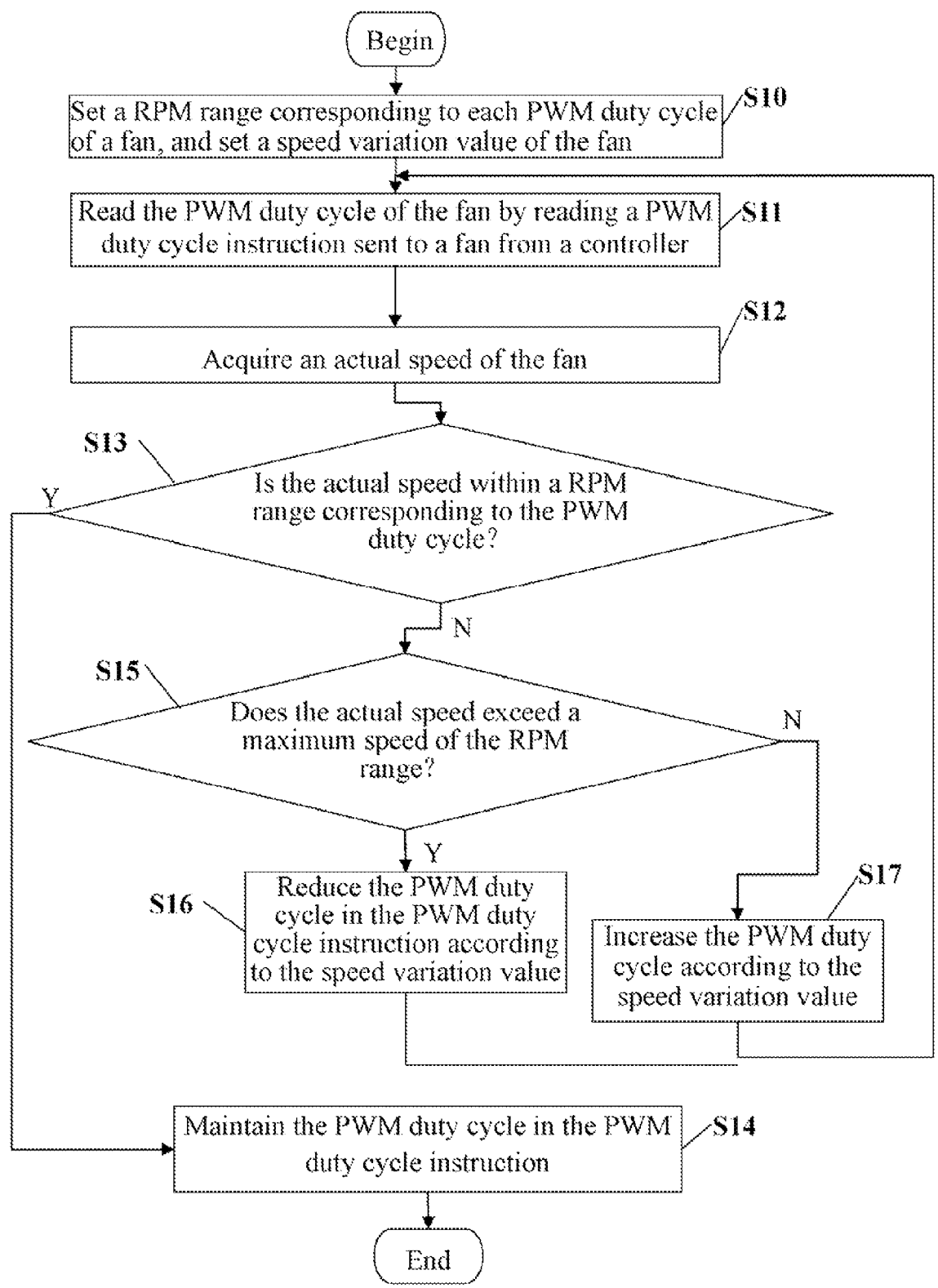
FIG. 4 is a flowchart of one embodiment of a method for controlling speed in an electronic device of FIG. 1.

FIG. 4 is a flowchart of one embodiment of a method for controlling speed of a fan of the electronic device of FIG. 1. Depending on the embodiment, additional blocks may be added, others removed, and the ordering of the blocks be changed.

In block S10, the setting module 200 sets a RPM range corresponding to each PWM duty cycle of the fan 30, and sets a speed variation value of the fan 30.

In block S11, the read module 202 reads the PWM duty cycle of the fan 30 by reading a PWM duty cycle instruction sent to the fan 30 from the controller 10.

In block S12, the acquisition module 204 acquires an actual speed of the fan 30 from the controller 20 according to the actual speed of the fan 30 detected by the controller 20.

In block S13, the determination module 202 determines whether the actual speed of the fan 30 is within the corresponding RPM range.

If the actual speed of the fan 30 is within the corresponding RPM range, in block S14, the control module 208 maintains the PWM duty cycle in the PWM duty cycle instruction.

If the actual speed of the fan 30 is not within the corresponding RPM range, in block S15, the determination module 206 further determines whether the actual speed of the fan 30 exceeds a maximum speed of the corresponding RPM range.

If the actual speed of the fan 30 exceeds a maximum speed of the corresponding RPM range, in block S16, the control module 208 reduces the PWM duty cycle in the PWM duty cycle instruction according to the speed variation value.

If the actual speed of the fan 30 is lower than a minimum speed of the corresponding RPM range, in block S17, the control module 208 further increases the PWM duty cycle according to the speed variation value.

It should be emphasized that the described exemplary embodiments are merely possible examples of implementations, and set forth for a clear understanding of the principles of the present disclosure. Many variations and modifications may be made to the-described exemplary embodiments without departing substantially from the spirit and principles of the present disclosure. All such modifications and variations are intended to be comprised herein within the scope of this disclosure and the-described inventive embodiments, and the present disclosure is protected by the following claims.

What is claimed is:

1. An electronic device, comprising:
    a fan;
    a controller;
    a storage system;
    at least one processor; and
    one or more programs stored in the storage system, executable by the at least one processor, the one or more programs comprising:
    a setting module operable to set a revolutions per minute (RPM) range corresponding to each pulse-width modulation (PWM) duty cycle of the fan, and set a speed variation value of the fan;
    a read module operable to read the PWM duty cycle of the fan by reading a PWM duty cycle instruction sent to the fan from the controller;
    an acquisition module operable to detect an actual speed of the fan; and
    a control module operable to reduce the PWM duty cycle in the PWM duty cycle instruction according to the speed variation value, under the condition that the actual speed exceeds a maximum speed of the RPM range corresponding to the PWM duty cycle.

2. The electronic device as claimed in claim 1, wherein the control module is further operable to increase the PWM duty cycle according to the speed variation value, under the condition that the actual speed is lower than a minimum speed of the RPM range corresponding to the PWM duty cycle.

3. The electronic device as claimed in claim 1, wherein the control module is further operable to maintain the PWM duty cycle in the PWM duty cycle instruction, upon the condition that the actual speed is lower than or equal to the maximum speed of the corresponding RPM range and larger than or equal to the minimum speed of the corresponding RPM range.

4. The electronic device as claimed in claim 1, wherein the controller is a basic input/output system (BIOS), or a basic management controller (BMC).

5. The electronic device as claimed in claim 4, wherein the acquisition module acquires the actual speed from the controller according to the actual speed of the fan detected by the controller.

6. The electronic device as claimed in claim 1, wherein the electronic device is a desktop computer, a notebook computer, or a server.

7. A computer-implemented method for controlling a speed of an electronic device, the electronic device comprising a fan and a controller, the method comprising:
    setting a revolutions per minute (RPM) range corresponding to each pulse-width modulation (PWM) duty cycle of the fan, and setting a speed variation value of the fan;
    reading the PWM duty cycle of the fan by reading a PWM duty cycle instruction sent to the fan from the controller;
    detecting an actual speed of the fan;
    reducing the PWM duty cycle in the PWM duty cycle instruction according to the speed variation value, under the condition that the actual speed exceeds a maximum speed of the RPM range corresponding to the PWM duty cycle; and
    increasing the PWM duty cycle according to the speed variation value, under the condition that the actual speed is lower than a minimum speed of the RPM range corresponding to the PWM duty cycle.

8. The method as claimed in claim 7, wherein the method further comprises:
    maintaining the PWM duty cycle in the PWM duty cycle instruction, upon the condition that the actual speed is lower than or equal to the maximum speed of the corresponding RPM range and larger than or equal to the minimum speed of the corresponding RPM range.

9. The method as claimed in claim 7, wherein the controller is a basic input/output system (BIOS), or a basic management controller (BMC).

10. The method as claimed in claim 9, wherein the method further comprises:
    acquiring the actual speed from the controller according to the actual speed of the fan detected by the controller.

11. The method as claimed in claim 7, wherein the electronic device is a desktop computer, a notebook computer, or a server.

12. A non-transitory storage medium storing a set of instructions, the set of instructions capable of executed by a processor to perform a method for controlling a speed of an electronic device, the electronic device comprising a fan and a controller, the method comprising:

setting a revolutions per minute (RPM) range corresponding to each pulse-width modulation (PWM) duty cycle of the fan, and setting a speed variation value of the fan;

reading the PWM duty cycle of the fan by reading a PWM duty cycle instruction sent to the fan from the controller;

detecting an actual speed of the fan; and reducing the PWM duty cycle in the PWM duty cycle instruction according to the speed variation value, under the condition that the actual speed exceeds a maximum speed of the RPM range corresponding to the PWM duty cycle.

13. The storage medium as claimed in claim 12, wherein the method further comprises:

increasing the PWM duty cycle according to the speed variation value, under the condition that the actual speed is lower than a minimum speed of the RPM range corresponding to the PWM duty cycle.

14. The storage medium as claimed in claim 13, wherein the controller is a basic input/output system (BIOS), or a basic management controller (BMC).

15. The storage medium as claimed in claim 14, wherein the method further comprises:

acquiring the actual speed from the controller according to the actual speed of the fan detected by the controller.

16. The storage medium as claimed in claim 12, wherein the method further comprises:

maintaining the PWM duty cycle in the PWM duty cycle instruction, upon the condition that the actual speed is lower than or equal to the maximum speed of the corresponding RPM range, and larger than or equal to the minimum speed of the corresponding RPM range.

17. The storage medium as claimed in claim 12, wherein the electronic device is a desktop computer, a notebook computer, or a server.

* * * * *